(12) United States Patent
Nakatani

(10) Patent No.: US 8,479,144 B2
(45) Date of Patent: Jul. 2, 2013

(54) SDK USE-RESTRICTION IMPOSING DEVICE, USE-RESTRICTION-IMPOSED SDK DEVELOPING SYSTEM, AND SDK USE-RESTRICTION IMPOSING METHOD

(75) Inventor: Ryusuke Nakatani, Osaka (JP)

(73) Assignee: KYOCERA Document Solutions Inc. (JP)

( * ) Notice: Subject to any disclaimer, the term of this patent is extended or adjusted under 35 U.S.C. 154(b) by 416 days.

(21) Appl. No.: 13/013,507

(22) Filed: Jan. 25, 2011

(65) Prior Publication Data
US 2011/0185189 A1 Jul. 28, 2011

(30) Foreign Application Priority Data
Jan. 26, 2010 (JP) ................................. 2010-013701

(51) Int. Cl.
*G06F 9/44* (2006.01)
(52) U.S. Cl.
USPC ......................................................... 717/100
(58) Field of Classification Search
USPC ......................................................... 717/100
See application file for complete search history.

(56) References Cited

U.S. PATENT DOCUMENTS

| 2004/0148516 | A1* | 7/2004 | Tohgi et al. | 713/200 |
|---|---|---|---|---|
| 2007/0067241 | A1* | 3/2007 | Malik | 705/51 |
| 2007/0107067 | A1* | 5/2007 | Fountian | 726/33 |
| 2008/0002221 | A1 | 1/2008 | Fujikura | |
| 2011/0067093 | A1* | 3/2011 | Kamada et al. | 726/7 |

FOREIGN PATENT DOCUMENTS
JP 2007-257555 10/2007

* cited by examiner

*Primary Examiner* — Philip Wang
(74) *Attorney, Agent, or Firm* — McDonnell Boehnen Hulbert & Berghoff LLP

(57) ABSTRACT

An SDK use-restriction imposing device includes a user interface unit, a source file of a use-restriction plug-in, a use-restriction plug-in edit unit, a build unit, and a use-restriction plug-in generation unit. The use-restriction plug-in edit unit sets use restrictions to the source file on the basis of use-restriction information received via the user interface unit. The build unit compiles the source file so as to generate an executable file of the use-restriction plug-in in response to a build instruction received via the user interface unit. The use-restriction plug-in generation unit generates a use-restriction-imposed SDK including an original SDK and the executable file of the use-restriction plug-in in response to an output instruction received via the user interface unit.

19 Claims, 7 Drawing Sheets

SDK USE-RESTRICTION IMPOSING DEVICE, USE-RESTRICTION-IMPOSED SDK DEVELOPING SYSTEM, AND SDK USE-RESTRICTION IMPOSING METHOD

INCORPORATION BY REFERENCE

This application is based upon and claims the benefit of priority from corresponding Japanese Patent Application No. 2010-013701, filed in the Japan Patent Office on Jan. 26, 2010, the entire contents of which is incorporated herein by reference.

BACKGROUND

1. Field of the Invention

The present disclosure relates to an SDK use-restriction imposing device, a use-restriction-imposed SDK developing system, and an SDK use-restriction imposing method.

2. Description of the Related Art

A software development kit (SDK) that is used to develop an application for an image forming apparatus is distributed from a SDK developer to an application developer by a SDK distributor. In such cases, in general, a license contract is concluded between the SDK developer and the SDK distributor, and a sub-license contract is concluded between the SDK distributor and the application developer.

The SDK distributor imposes restrictions such as use restrictions on the SDK and allows the application developer to try the SDK free of charge. As a result, the SDK distributor may conclude sub-license contracts with many application developers.

The internal structure of the SDK may be changed by imposing use restrictions on the SDK. If an unexpected error occurs while the SDK is being used, the reliability of the SDK will be reduced. In addition, the SDK distributor needs to know the internal structure of the SDK in order to impose use restrictions on the SDK, and hence much time and labor may be taken by the distributor to impose such use restrictions on the SDK.

An example of imposing use restrictions on an SDK is known in which use-restriction information is stored in a USB memory and the SDK is activated by inserting the USB memory into an image forming apparatus so as to permit use of the SDK for a predetermined period as determined by information stored in the USB memory.

However, in the above-described example, a USB memory that is prepared separately from an image forming apparatus is required.

SUMMARY

The present disclosure relates to an SDK use-restriction imposing device, a use-restriction-imposed SDK developing system, and an SDK use-restriction imposing method, in which use restrictions are imposed on an SDK without requiring an activation key such as a USB memory or the like and without requiring a distributor distributing software to be used in an image forming apparatus to change the internal structure of the SDK.

An SDK use-restriction imposing device according to one aspect of this disclosure includes a user interface unit, a source file of a use-restriction plug-in, a use-restriction plug-in edit unit configured to set use restrictions to the source file on the basis of use-restriction information received via the user interface unit, a build unit configured to compile the source file so as to generate an executable file of the use-restriction plug-in in response to a build instruction (instruction to build a file) received via the user interface unit, and a use-restriction plug-in generation unit configured to generate a use-restriction-imposed SDK (an SDK upon which use restrictions have been imposed) including an original SDK and the executable file of the use-restriction plug-in in response to an output instruction received via the user interface unit.

A use-restriction-imposed SDK developing system according to one aspect of the present disclosure includes an original SDK development support device configured to support development of an original SDK and an SDK use-restriction imposing device. The SDK use-restriction imposing device includes a user interface unit, a source file of a use-restriction plug-in, a use-restriction plug-in edit unit configured to set use restrictions for the source file on the basis of use-restriction information received via the user interface unit, a build unit configured to compile the source file so as to generate an executable file of the use-restriction plug-in in response to a build instruction received via the user interface unit, and a use-restriction plug-in generation unit configured to generate a use-restriction-imposed SDK including an original SDK and the executable file of the use-restriction plug-in in response to an output instruction received via the user interface unit. The original SDK includes a plug-in core module configured to upon start-up, query the use-restriction plug-in and continue or terminate execution in accordance with a response from the use-restriction plug-in.

An SDK use-restriction imposing method via an SDK use-restriction imposing device according to one aspect of the present disclosure includes setting use restrictions to a source file of a use-restriction plug-in on the basis of use-restriction information via a use-restriction plug-in edit unit, compiling the source file and generating an executable file of the use-restriction plug-in via a build unit, and generating a use-restriction-imposed SDK including an original SDK and the executable file of the use-restriction plug-in via a use-restriction plug-in generation unit.

BRIEF DESCRIPTION OF THE FIGURES

In the accompanying drawings:

FIG. 5 is a flowchart illustrating a process of a use-restriction plug-in;

DETAILED DESCRIPTION

Figure 1:
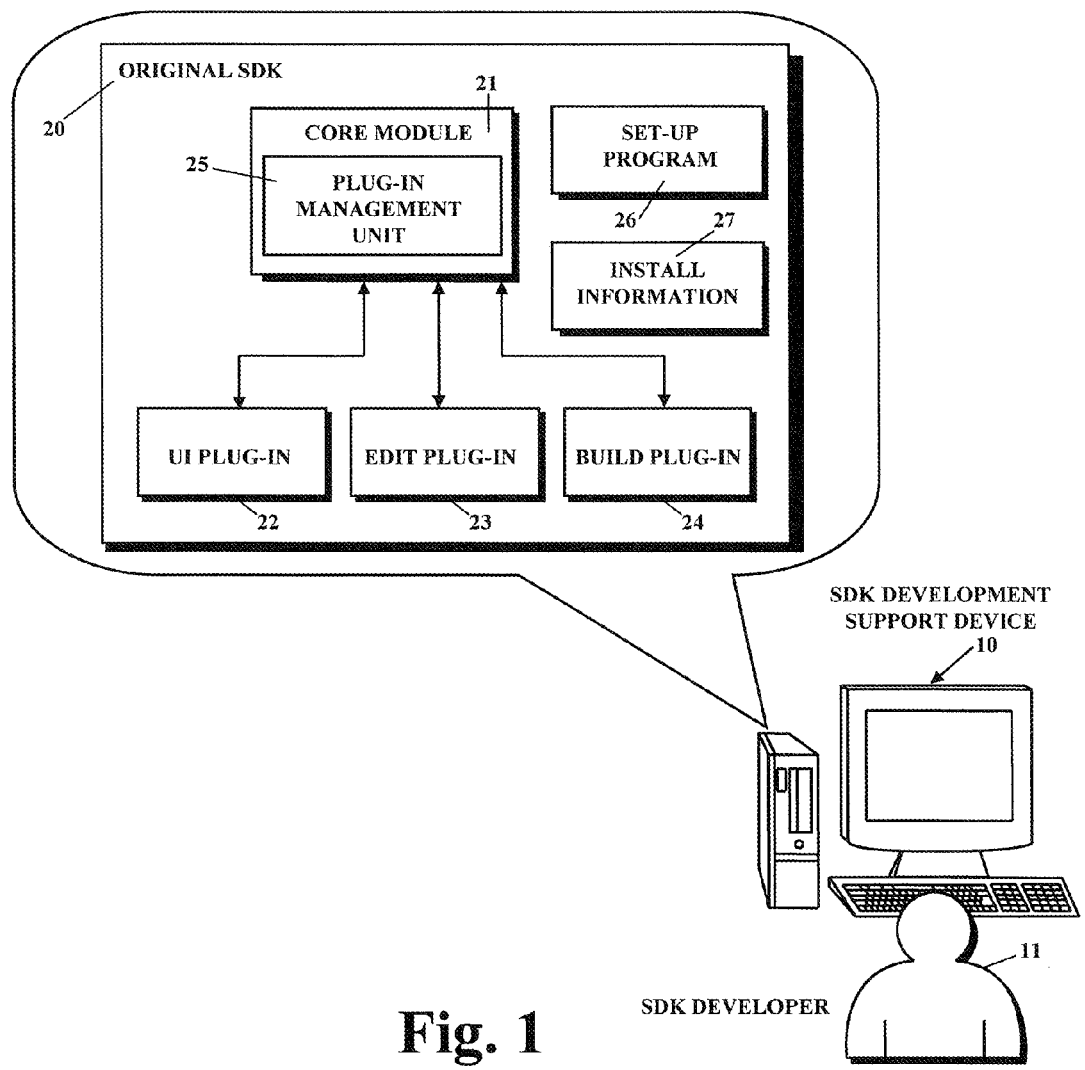
FIG. 1 is a block diagram illustrating a configuration of an SDK.

FIG. 1 is a block diagram illustrating a configuration of an SDK 20 that is developed by an SDK developer using an SDK development support device 10.

A SDK developer 11 uses the SDK development support device 10, onto which an SDK development support tool is installed, and the SDK developer 11 operates an input device to develop an SDK. The developed SDK is built and distributed to an SDK distributor, and a license contract is concluded between the SDK developer 11 and the SDK distributor. The license contract may include such terms that the SDK developer grants the SDK distributor the right to allow an application developer to try the SDK, free of charge, for a restricted period of time. Hereinafter, the SDK that has been built will be referred to as an original SDK in order to distinguish it from a use-restriction-imposed SDK.

The original SDK 20 includes a core module 21 including a basic function as the SDK, and a user interface (UI) plug-in 22, an edit plug-in 23, and a build plug-in 24 that are used to expand the above-described basic function. The plug-ins 22 to 24 may be dynamic link library (DLL) files of an executable form. The plug-ins 22 to 24 may be assemblies (e.g., compiled code libraries) including accompanying assembly manifests.

The core module 21 includes a plug-in management unit 25. After the core module 21 has been started, the plug-in management unit 25 seeks for an effective plug-ins, seeks for any effective classes in each located effective plug-in, generates instances on the basis of the located classes, and causes each effective plug-in to execute a predetermined method at a predetermined time. The original SDK 20 may also include a set-up program 26 used to install the SDK into a computer and install information 27 used by the set-up program 26.

Figure 2:
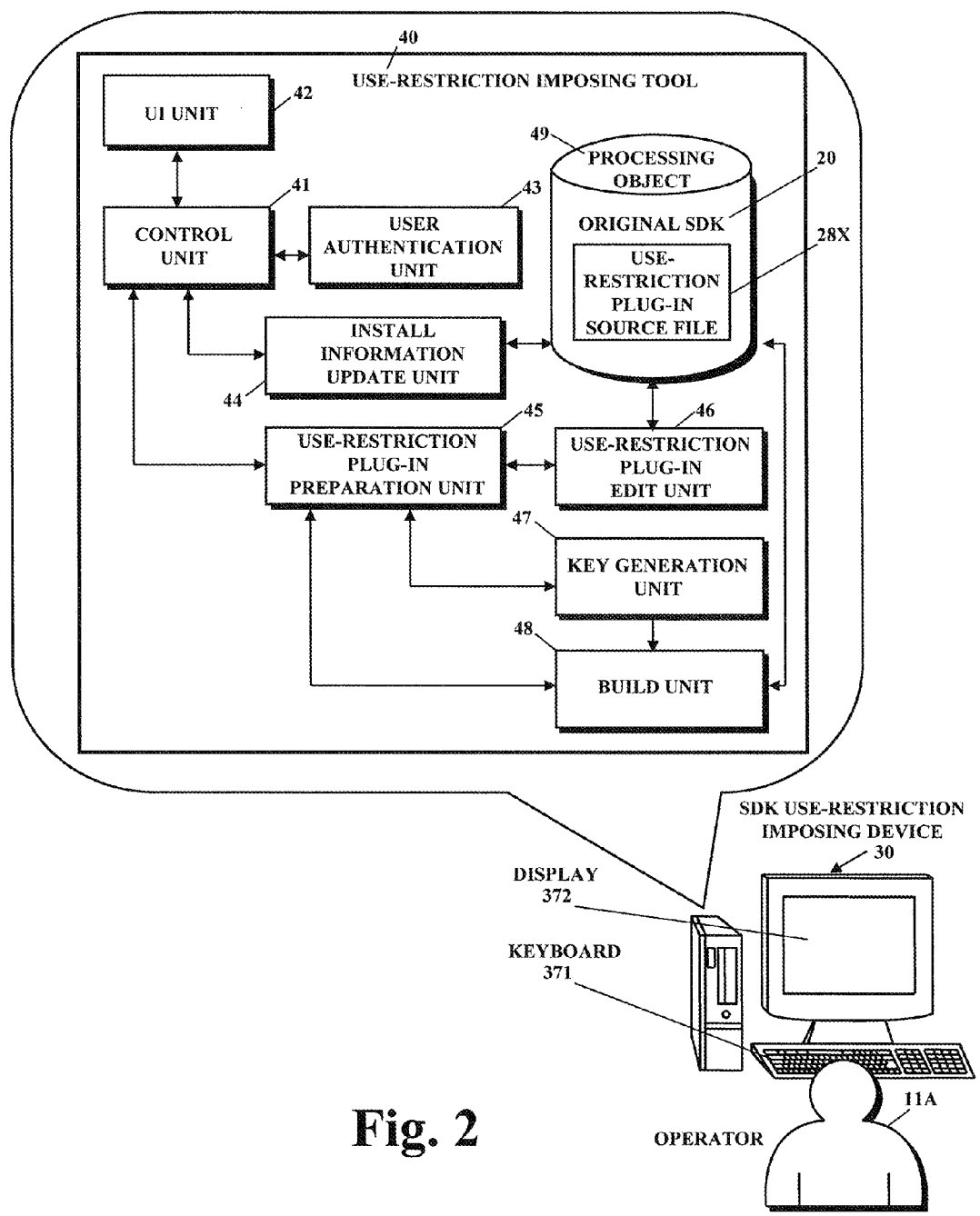
FIG. 2 is a block diagram illustrating a configuration of a use-restriction imposing tool.

FIG. 2 is a block diagram illustrating a configuration of a use-restriction imposing tool 40 that is installed into an SDK use-restriction imposing device 30 that is used by the SDK distributor. Further, FIG. 3 is a block diagram illustrating a configuration of a use-restriction-imposed SDK 20A that has been prepared using the SDK use-restriction imposing device 30 illustrated in FIG. 2.

Figure 3:
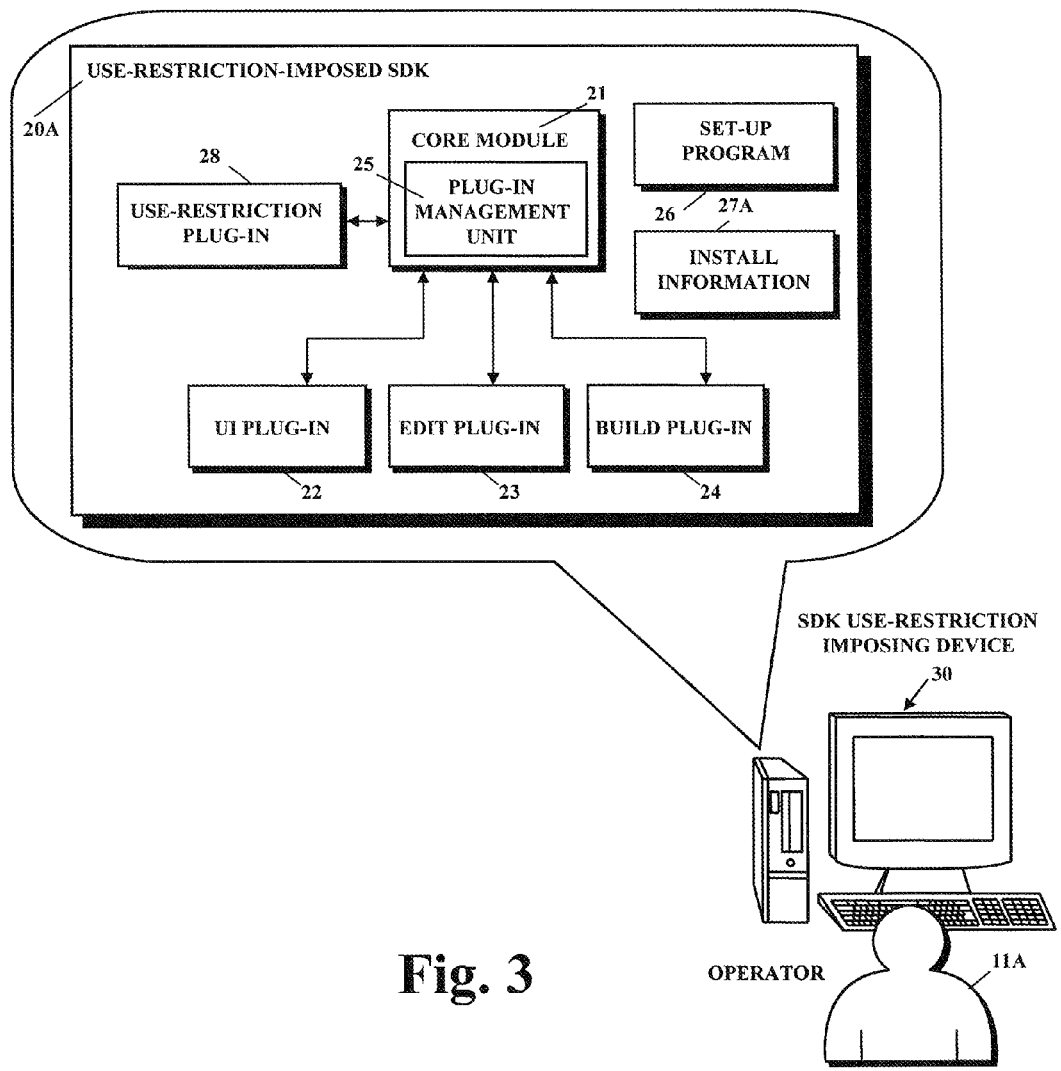
FIG. 3 is a block diagram illustrating a configuration of a use-restriction-imposed SDK.

An operator 11A stores the original SDK 20 that has been received from the SDK developer 11 into a storage unit (not illustrated) of the SDK use-restriction imposing device 30, then starts up the use-restriction imposing tool 40 and operates an input device to generate the use-restriction-imposed SDK 20A illustrated in FIG. 3.

The use-restriction-imposed SDK 20A of FIG. 3 is obtained by adding a use-restriction plug-in 28 to the original SDK 20 illustrated in FIG. 1. Install information 27A of the use-restriction-imposed SDK 20A is obtained by adding information to the install information 27 so that the use-restricted plug-in 28 is included as an object to be installed.

Figure 4:
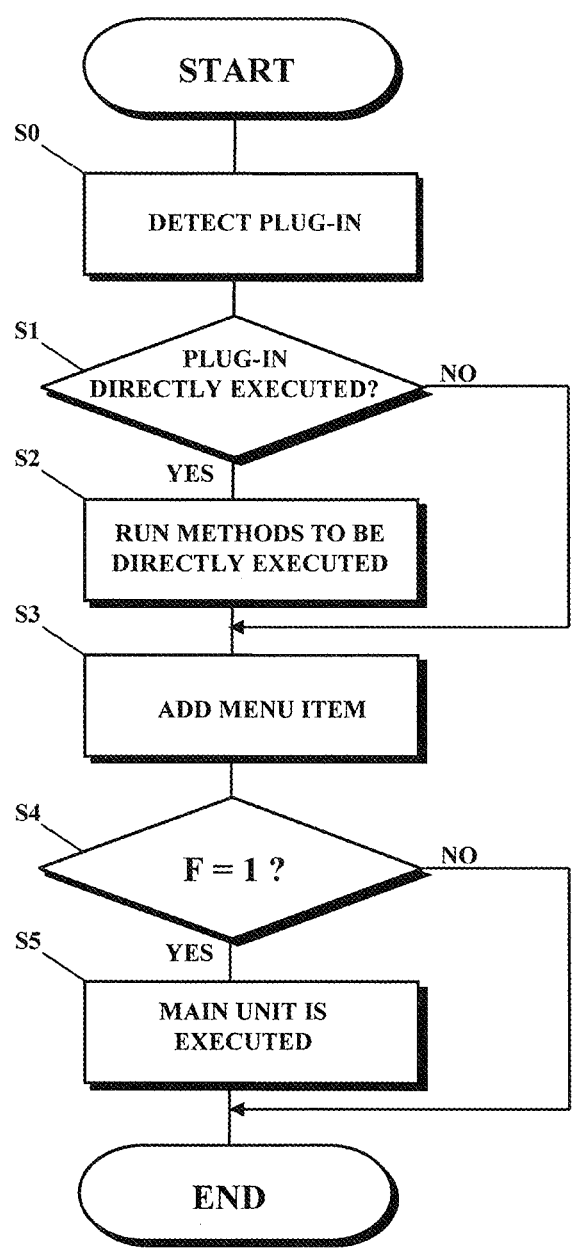
FIG. 4 is a flowchart illustrating a process of a core module.

FIG. 4 is a flowchart illustrating a process of the core module 21 illustrated in FIGS. 1 and 3. Steps S0 to S4 are processes that a main routine in the core module 21 causes the plug-in management unit 25 to execute.

(S0) The main routine in the core module 21 causes the plug-in management unit 25 to detect all files with extensions DLL (Dynamic Link Library) in a predetermined folder, verify their digital signatures (included in respective DLLs), and select only appropriate verified DLL files. The predetermined folder includes a first directory in which the core module 21 is disposed or a second directory that is a subordinate of the first directory. Then, the plug-in management unit 25 generates instances based on only those classes that are implemented with a predetermined plug-in interface in each of the selected DLL files and substitutes references of the instance into an array. A DLL that does not include a class implemented with the plug-in interface is regarded as out of an object. The plug-in interface includes a run method, a variable property used to distinguish direct execution of the run method from execution of the run method in response to clicking of a menu item, and a menu item name property.

(S1) If the variable property indicating direct execution of the run method is present, the process proceeds to step S2. If not, the process will proceed to step S3. In one example, the UI plug-in 22 and the use-restriction plug-in 28 directly execute the run method, and the edit plug-in 23 and the build plug-in 24 execute the run method in response to clicking of a menu item.

(S2) Run methods that are to be directly executed are executed in order.

(S3) The name of each menu item to be executed in response to clicking of the menu item is added to a menu display list of a pull-down menu. The main unit of the core module 21 includes an event handler that executes, in response to clicking of the menu item, a run method belonging to an instance that is referred to via an array element. The menu item is identified with an index of the array element.

(S4) If the value of a use permission flag F that represents use permission information is "1", the process will proceed to step S5. If not, execution by the core module 21 will be terminated. The use permission flag F is reset in an initializing process (not illustrated) that is executed prior to execution of the process at step S0. If the use permission period has not yet expired, the value of the use permission flag F is set using the use-restriction plug-in 28. Therefore, in the case that the use-restriction plug-in 28 has been deleted, the process is not permitted to proceed to the next step S5.

(S5) The main unit of the core module 21 is executed. That is, a corresponding process is executed in accordance with generation of an event that is caused by a user input operation.

The digital signature of each plug-in may be verified at step S0, and therefore any falsified use-restriction plug-in 28 is not permitted to be used.

Figure 5:
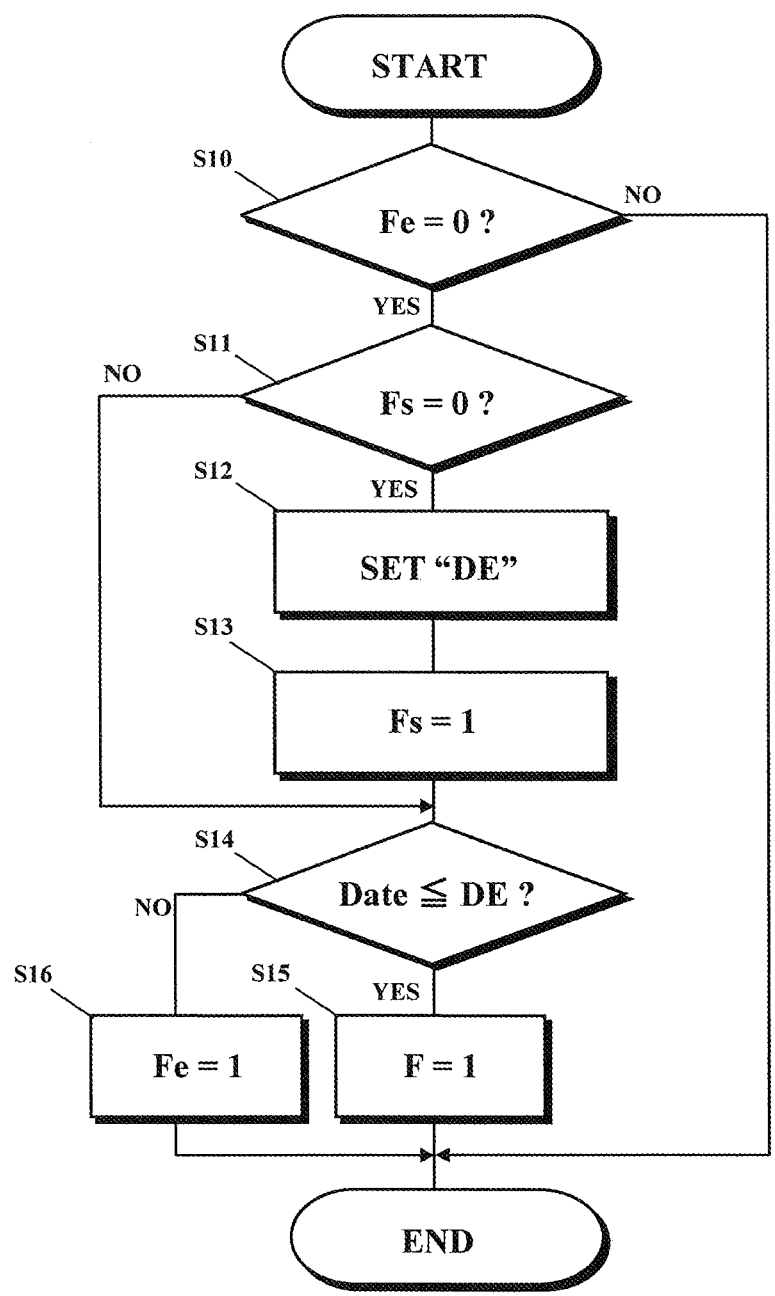

FIG. 5 is a flowchart illustrating a process of the use-restriction plug-in illustrated in FIG. 3.

(S10) If the value of an end-of-use flag Fe that represents end-of-use information is "0", the process will proceed to step S11. If not, execution of the run method will be terminated and control will be returned to the core module 21. The initial value of the end-of-use flag Fe is "0".

(S11) If the value of a start-of-use flag Fs that represents start-of-use information is "0", the process will proceed to step S12. If not, the process will proceed to step S14. The initial value of the start-of-use flag Fs is "0". The start-of-use flag Fs is stored in a nonvolatile storage unit (not illustrated) that is outside of the core module 21 and outside of the use-restriction plug-in 28 in the SDK 20A, for example, in a registry or a hidden file of an OS.

Next described is an example of storing the start-of-use flag Fs in the hidden file. The value of the start-of-use flag Fs is set to a value other than "1" and "0" before the flag Fs is stored in the hidden file. The set value may be encrypted using a key obtained by combining unique information on a device in which the SDK 20A is installed, such as, an ID of a CPU with a password so that the start-of-use information is not permitted to be copied and used in another device. In addition, falsification of the start-of-use information may be prevented by generating a digital signature on the basis of the value encrypted.

Accordingly, once the start-of-use flag Fs is set, the process may not be permitted to proceed to step S12 regardless of replacement of the use-restriction plug-in 28 with a new one or replacement of the SDK 20A with a new one. As a result, it may not be permitted to reset an end-of-use date DE, and hence unauthorized use of the SDK may be prevented. If the start-of-use flag Fs is already present in the hidden file, the set-up program 26 does not overwrite the start-of-use flag.

(S12) The end-of-use date DE is set. For example, a date that is obtained by adding six months, for which use of the SDK is permitted, to the current date is used as the end-of-use date DE.

(S13) The start-of-use flag Fs is set to "1". Thus, the process at step S13 and the process at step S12 are only executed once.

(S14) If the current date "Date" does not exceed the end-of-use date DE, the process will proceed to step S15. If not, the process will proceed to step S16. The initial value of the end-of-use date DE is a past date.

(S15) The use permission flag F is set to "1", execution of this run method is terminated and control is returned to the core module 21. The use permission flag F is set through a core module interface that is provided in a plug-in management module.

(S16) The end-of-use flag Fe is set, execution of the run method is terminated and control is returned to the core module 21. The end-of-use flag Fe is also stored in the nonvolatile storage unit that is outside of the core module 21 and outside of the use-restriction plug-in 28 in the SDK 20A as in the case of the start-of-use flag Fs. Also, the set-up program 26 is stored in the nonvolatile storage unit.

Accordingly, once the end-of-use information Fe is set, execution of the process illustrated in FIG. 5 is terminated at step S10 and it may not be permitted to proceed to step S15 regardless of replacement of the use-restriction plug-in 28 with a new one or replacement of the SDK 20A with a new one. As a result, unauthorized use of the SDK may be prevented.

With the execution of above-described processes, an application developer is permitted to use the SDK only for a predetermined period after starting to use the SDK without requiring modification of the core module 21 and the plug-ins 22 to 24 and without requiring any activation key such as a USB key. In addition, unauthorized extensions of the use permission period may be prevented.

Figure 6:
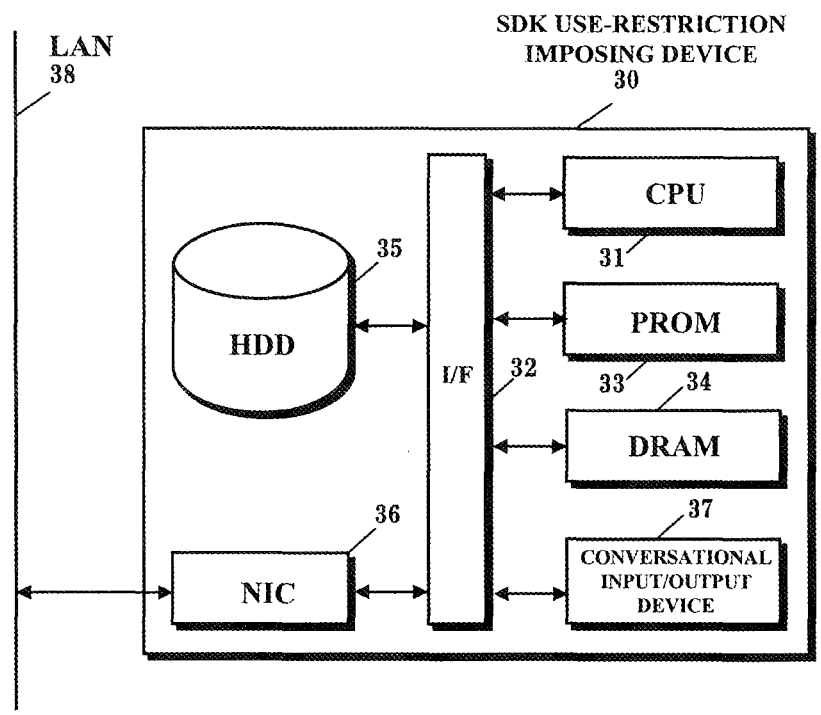
FIG. 6 is a block diagram illustrating a hardware configuration of the SDK use-restriction imposing device.

FIG. 6 is a block diagram illustrating a hardware configuration of the SDK use-restriction imposing device 30.

In the SDK use-restriction imposing device 30, a CPU 31 is coupled to a PROM 33, a DRAM 34, a hard disk drive (HDD) 35, a network interface card (NIC) 36, and an input/output device 37 through an interface (I/F) 32. In the example illustrated in FIG. 6, a plurality of kinds of interfaces are expressed as one block 32.

The PROM 33 is, for example, a flash memory and stores a Basic Input/Output System (BIOS). The DRAM 34 is used as a main storage device. An Operating System (OS), various drivers and applications, and various pieces of data are stored in the hard disk drive 35. The use-restriction imposing tool 40 illustrated in FIG. 2 is included as one of the applications stored in the hard disk drive 35. The network interface 36 is coupled to a LAN 38. The input/output device 37 may include a keyboard 371, a pointing device, and/or a display 372 as illustrated in FIG. 2.

A configuration of the use-restriction imposing tool 40 illustrated in FIG. 2 will now be described. The use-restriction imposing tool 40 includes a control unit 41 acting as a main routine; and includes a UI unit 42, a user authentication unit 43, an install information update unit 44, and a use-restriction plug-in preparation unit 45 that are called from the control unit 41 to execute respective processes. The use-restriction imposing tool 40 further includes a use-restriction plug-in edit unit 46, a key generation unit 47, and a build unit 48 that are called from the use-restriction plug-in preparation unit 45 to execute respective processes; and further includes a processing object 49. The processing object 49 includes a use-restriction plug-in source file 28X as the processing object of the use-restriction plug-in edit unit 46 and the build unit 48, and the original SDK 20 including the processing object of the install information update unit 44.

The user interface (UI) unit 42 causes the display 372 to display an input screen corresponding to an input screen identification ID that is designated by the control unit 41. The user interface (UI) unit 42 delivers a character string that has been input into a predetermined area on the input screen via an input device to the control unit 41 in accordance with a request from the control unit 41. In order to prohibit unauthorized use of the use-restriction imposing tool 40, the user authentication unit 43 verifies a set of an ID and a password that the operator 11A inputs. The install information update unit 44 adds information to the install information 27 in the original SDK 20 in response to a call from the control unit 41. The install information update unit 44 provides the install information 27A so as to include the use-restriction plug-in 28 as an object to be installed. In response to a call from the control unit 41, the use-restriction plug-in preparation unit 45 edits the use-restriction plug-in source file 28X through the use-restriction plug-in edit unit 46, generates a pair of keys used as the digital signature through the key generation unit 47, and compiles the use-restriction plug-in source file 28X through the build unit 48 to generate the use-restriction plug-in 28 (assembly) with the executable digital signature.

Figure 7:
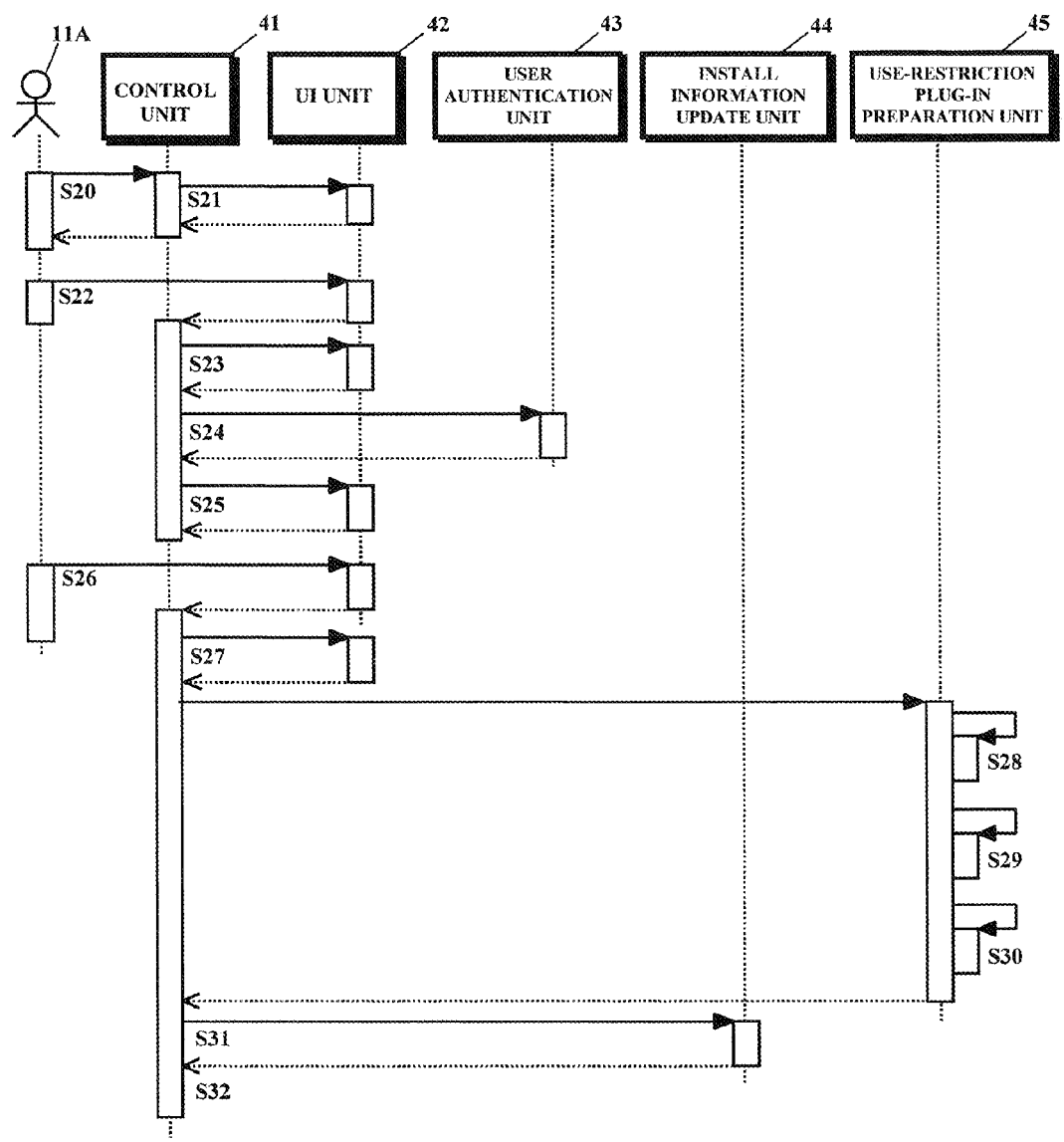
FIG. 7 is a sequence diagram illustrating an operation of the use-restriction imposing tool.

FIG. 7 is a sequence diagram illustrating operations of the use-restriction imposing tool 40.

(S20) The operator 11A operates the keyboard 371 to start up the control unit 41.

(S21) In response to the operation of the operator 11A, the control unit 41 causes the display 372 to display a log-in information input screen via the UI unit 42.

(S22) The operator 11A inputs the ID and password through the keyboard 371 and the UI unit 42 holds the input ID and password as log-in information. The operator 11A gives a command to confirm the log-in information through the keyboard 371.

(S23) The control unit 41 acquires the log-in information through the UI unit 42 in response to the command from the operator 11A.

(S24) The control unit 41 calls the user authentication unit 43 to perform user authentication using the acquired log-in information as an argument.

(S25) If the user authentication has been successfully performed, the control unit 41 causes the display 372 to display a use-restriction information input screen through the UI unit 42.

(S26) The operator 11A operates the keyboard 371 and inputs use-restriction information and a command to confirm the use-restriction information. The use-restriction information includes the use permission period of the SDK.

(S27) The control unit 41 acquires the use-restriction information in response to the command to confirm the information.

(S28) The control unit 41 sets the use-restriction information to the use-restriction plug-in source file 28X using the use-restriction plug-in preparation unit 45 and the use-restriction plug-in edit unit 46 (in FIG. 2).

(S29) The use-restriction plug-in preparation unit 45 generates a pair of a secret key and a public key through the key generation unit 47 (in FIG. 2).

(S30) The use-restriction plug-in preparation unit 45 compiles the processing object 49 (in FIG. 2) to which the use-restriction information is set, and encrypts a hash value thereof with the secret key to generate a digital signature. The use-restriction plug-in preparation unit 45 includes the digital signature and a public key token corresponding to the public key in an assembly manifest, and generates the use-restriction plug-in (assembly) 28 including the assembly manifest through the build unit 48 (in FIG. 2).

The public key that is authorized by the original SDK developer is included in the core module 21 so that the core module 21 can verify the digital signature.

(S31) The control unit 41 adds information to the install information 27 in the original SDK 20 so as to include the use-restriction plug-in 28 as an object to be copied when installed and generates the install information 27A through the install information update unit 44. Then, the digital signature included in the install information 27 is substituted for a digital signature that is obtained by encrypting a hash value of the install information obtained after updated in the above-described manner. The set-up program 26 verifies the digital signature when started and executes an installation only when the digital signature has been verified as an appropriate one.

A public key token (a hash value of the public key) corresponding to the public key that is authorized by the SDK developer is included in advance in the set-up program 26. The foregoing also applies to the case in which the core module 21 verifies the use-restriction plug-in 28.

(S32) The control unit 41 includes a set of information other than the install information 27 in the original SDK 20, the install information 27A, and the use-restriction plug-in 28 as the use-restriction-imposed SDK 20A in a folder, and stores (outputs) the set as the use-restriction-imposed SDK 20A, as illustrated in FIG. 3, into the hard disk drive 35.

The present disclosure includes various other embodiments. For example, other designs can be used in which the above-described components are each performed.

In the above-described embodiments, the use-restriction information may include a set of the start-of-use date and the use permission period or a set of the start-of-use date and the end-of-use date.

In the above-described embodiments, an SDK for sale to be used on the basis of a sub-license contract may be prepared by setting the use permission period substantially infinite, for example, to a hundred years.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An SDK use-restriction imposing device comprising:
    a processor;
    a user interface unit;
    a source file of a use-restriction plug-in;
    a use-restriction plug-in edit unit configured to set use restrictions to the source file on the basis of use-restriction information received via the user interface unit;
    a build unit configured to compile the source file so as to generate an executable file of the use-restriction plug-in in response to a build instruction received via the user interface unit; and
    a use-restriction plug-in generation unit configured to generate a use-restriction-imposed SDK including an original SDK and the executable file of the use-restriction plug-in in response to an output instruction received via the user interface unit, wherein the original SDK includes a plug-in core module configured to, upon start-up, query the use-restriction plug-in and continue or terminate execution in accordance with a response from the use-restriction plug-in.

2. The SDK use-restriction imposing device according to claim 1, wherein the use-restriction information includes a use permission period counted from a start-of-use date.

3. The SDK use-restriction imposing device according to claim 2, wherein:
    when start-of-use information indicates a "before start-of-use" value, the use-restriction plug-in is configured to (i) determine a period that is obtained by adding the use permission period to a current date and set the result as a use deadline, (ii) set the start-of-use information to an "after start-of-use" value, and (iii) set use permission information to a "use permitted" value when the current date does not exceed the use deadline,
    when the start-of-use information indicates the "after start-of-use" value, the use-restriction plug-in is configured to set the use permission information to the "use permitted" value when the current date does not exceed the use deadline, and
    the use-restriction plug-in is configured to send the core module the use permission information as the response.

4. The SDK use-restriction imposing device according to claim 3, wherein when the current date exceeds the use deadline, the use-restriction plug-in is configured to (i) set end-of-use information to an "after end-of-use" value and (ii) cause the core module to terminate the execution.

5. The SDK use-restriction imposing device according to claim 4, wherein the start-of-use information and the end-of-use information are stored in a non-volatile storage unit outside of the core module and outside of the use-restriction plug-in.

6. The SDK use-restriction imposing device according to claim 1, further comprising a key generation unit,
    wherein the key generation unit is configured to generate a secret key and a public key.

7. The SDK use-restriction imposing device according to claim 6, wherein the use-restriction plug-in generation unit is configured to encrypt a hash value of the executable file of the use-restriction plug-in with the secret key and generates a digital signature.

8. The SDK use-restriction imposing device according to claim 7, wherein the use-restriction plug-in generation unit includes the digital signature and a public key token corresponding to the public key in an assembly manifest and generates a use-restriction plug-in assembly including the assembly manifest.

9. A use-restriction-imposed SDK developing system comprising:
    a processor;
    an original SDK development support device configured to support development of an original SDK; and
    an SDK use-restriction imposing device,
    wherein the SDK use-restriction imposing device includes:
        a user interface unit;
        a source file of a use-restriction plug-in;
        a use-restriction plug-in edit unit configured to set use restrictions to the source file on the basis of use-restriction information received via the user interface unit;
    a build unit configured to compile the source file so as to generate an executable file of the use-restriction plug-in in response to a build instruction received via the user interface unit; and
    a use-restriction plug-in generation unit configured to generate a use-restriction-imposed SDK including an original SDK and the executable file of the use-restriction plug-in in response to an output instruction received via the user interface unit, and wherein the original SDK includes a plug-in core module configured to, upon start-up, query the use-restriction plug-in and continue or terminate execution in accordance with a response from the use-restriction plug-in.

10. The use-restriction-imposed SDK developing system according to claim 9, wherein the use-restriction information includes a use permission period counted from a start-of-use date.

11. The use-restriction-imposed SDK developing system according to claim 10, wherein:
  when start-of-use information indicates a "before start-of-use" value, the use-restriction plug-in is configured to (i) determine a period that is obtained by adding the use permission period to a current date and set the result as a use deadline, (ii) set the start-of-use information to an "after start-of-use" value, and (iii) set use permission information to a "use permitted" value when the current date does not exceed the use deadline,
  when the start-of-use information indicates the "after start-of-use" value, the use-restriction plug-in is configured to set the use permission information to the "use permitted" value when the current date does not exceed the use deadline, and
  the use-restriction plug-in is configured to send the core module the use permission information as the response.

12. The use-restriction-imposed SDK developing system according to claim 11, wherein when the current date exceeds the use deadline, the use-restriction plug-in is configured to (i) set end-of-use information to an "after end-of-use" value and (ii) cause the core module to terminate the execution.

13. The use-restriction-imposed SDK developing system according to claim 12, wherein the start-of-use information and the end-of-use information are stored in a non-volatile storage unit outside of the core module and outside of the use-restriction plug-in.

14. The use-restriction-imposed SDK developing system according to claim 9, wherein the SDK use-restriction imposing device further includes a key generation unit, and
  wherein the key generation unit is configured to generate a secret key and a public key.

15. The use-restriction-imposed SDK developing system according to claim 14, wherein the use-restriction plug-in generation unit is configured to encrypt a hash value of the executable file of the use-restriction plug-in with the secret key and generates a digital signature.

16. A computer-implemented SDK use-restriction imposing method via an SDK use-restriction imposing device comprising:
  setting use restrictions to a source file of a use-restriction plug-in on the basis of use-restriction information via a use-restriction plug-in edit unit;
  compiling the source file and generating an executable file of the use-restriction plug-in via a build unit; and
  generating a use-restriction-imposed SDK including an original SDK and the executable file of the use-restriction plug-in via a use-restriction plug-in generation unit, wherein the original SDK includes a plug-in core module configured to, upon start-up, query the use-restriction plug-in and continue or terminate execution in accordance with a response from the use-restriction plug-in.

17. The SDK use-restriction imposing method according to claim 16; further comprising:
  generating a secret key and a public key via a key generation unit.

18. The SDK use-restriction imposing method according to claim 17, further comprising:
  encrypting a hash value of the executable file of the use-restriction plug-in with the secret key and generating a digital signature via the use-restriction plug-in generation unit.

19. The SDK use-restriction imposing method according to claim 18, further comprising:
  including the digital signature and a public key token corresponding to the public key in an assembly manifest and generating a use-restriction plug-in assembly including the assembly manifest via the use-restriction plug-in generation unit.

* * * * *